United States Patent
Min

(10) Patent No.: US 10,461,546 B2
(45) Date of Patent: Oct. 29, 2019

(54) SYSTEM AND METHOD OF MANAGING BATTERY BY USING BALANCING BATTERY

(71) Applicant: LG CHEM, LTD., Seoul (KR)

(72) Inventor: Kyoung Choon Min, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/711,709

(22) Filed: Sep. 21, 2017

(65) Prior Publication Data

US 2018/0083460 A1 Mar. 22, 2018

(30) Foreign Application Priority Data

Sep. 21, 2016 (KR) .................. 10-2016-0120812

(51) Int. Cl.
| | |
|---|---|
| H02J 7/00 | (2006.01) |
| H01M 10/44 | (2006.01) |
| H01M 10/42 | (2006.01) |
| H01M 10/6563 | (2014.01) |
| H01M 10/0525 | (2010.01) |

(52) U.S. Cl.
CPC ....... *H02J 7/0019* (2013.01); *H01M 10/4207* (2013.01); *H01M 10/44* (2013.01); *H01M 10/6563* (2015.04); *H02J 7/0054* (2013.01); *H02J 7/0063* (2013.01); *H01M 10/0525* (2013.01); *Y02T 10/7055* (2013.01)

(58) Field of Classification Search
USPC ........................................... 320/118
See application file for complete search history.

(56) References Cited

U.S. PATENT DOCUMENTS

| | | | | |
|---|---|---|---|---|
| 5,578,914 A * | 11/1996 | Morita | ............... | H01M 10/44 320/122 |
| 5,631,534 A * | 5/1997 | Lewis | ............... | H01M 10/441 320/103 |
| 6,873,134 B2 * | 3/2005 | Canter | ............... | H02J 7/0021 320/118 |
| 7,535,198 B2 * | 5/2009 | Lee | ............... | H02J 7/0019 320/118 |

(Continued)

FOREIGN PATENT DOCUMENTS

| | | |
|---|---|---|
| JP | 2004080914 A | 3/2004 |
| KR | 10-2006-0109048 A | 10/2006 |
| KR | 101387658 B1 | 4/2014 |

*Primary Examiner* — Samuel Berhanu
(74) *Attorney, Agent, or Firm* — Lerner, David, Littenberg, Krumholz & Mentlik, LLP

(57) ABSTRACT

Disclosed are a system and a method of managing a battery by using a balancing battery. The system for managing a battery includes: a battery unit which includes a plurality of battery modules and provides electric energy to an electronic device; a cooling fan which adjusts a flow rate of a fluid flowing into the battery unit; a fan control circuit which controls an operation of the cooling fan; and a balancing battery which performs balancing of the plurality of battery modules by supplying electric energy to one or more of the plurality of battery modules and charging the one or more battery modules, or receiving electric energy from one or more of the plurality of battery modules, and supplies electric energy to the cooling fan under a control of the fan control circuit.

15 Claims, 7 Drawing Sheets

(56) References Cited

U.S. PATENT DOCUMENTS

| | | | | |
|---|---|---|---|---|
| 8,535,104 B1* | 9/2013 | Nida | ............... | B63H 21/383 |
| | | | | 180/68.2 |
| 2002/0033692 A1* | 3/2002 | Sakai | ............... | H02J 9/061 |
| | | | | 320/134 |
| 2002/0043946 A1* | 4/2002 | Yoshimura | ............... | H02P 6/24 |
| | | | | 318/139 |
| 2003/0087148 A1* | 5/2003 | Minamiura | ............... | H01M 10/482 |
| | | | | 429/62 |
| 2007/0141454 A1* | 6/2007 | Marukawa | ............... | B60R 16/04 |
| | | | | 429/120 |
| 2010/0279153 A1* | 11/2010 | Payne | ............... | H01M 10/486 |
| | | | | 429/50 |

* cited by examiner

SYSTEM AND METHOD OF MANAGING BATTERY BY USING BALANCING BATTERY

TECHNICAL FIELD

This application claims priority to and the benefit of Korean Patent Application No. 10-2016-0120812 filed in the Korean Intellectual Property Office on Sep. 21, 2016, the entire contents of which are incorporated herein by reference.

The present invention relates to a system and a method of managing a battery by using a balancing battery, and more particularly, to a system and a method of managing a battery including a balancing battery which performs balancing of a plurality of battery modules by charging or discharging one or more of the plurality of battery modules, and supplies electric energy to the microprocessor.

BACKGROUND ART

A battery balancing system is a technology for adjusting an output voltage of the plurality of battery modules included in a battery system to be the same voltage. When the balancing system is applied to the battery system, it is possible to prevent explosion and fire generated during overcharging and prevent a life of a battery from being decreased due to overdischarging, thereby enabling the battery to fully exert performance.

In general, in order to perform the balancing, a balancing circuit is configured by a method of discharging power of a cell having a high voltage within an application specific integrated circuit (ASIC) to perform balancing on each battery module. However, in the foregoing balancing, the balancing is performed only by the manual method of consuming power of some battery modules, so that there is a problem in that energy of the battery system is not efficiently used.

Korean Patent Application Laid-Open No. 10-2006-0109048 discloses a switching circuit for balancing a battery cell. However, the battery system adopting the foregoing method includes the plurality of switches, so that there is a problem in that a configuration of the circuit is complex, and the balancing can be performed only by the method of manually consuming energy of the battery.

RELATED ART LITERATURE

Patent Document (Patent Document 1) Korean Patent Application Laid-Open No. 10-2006-0109048

DETAILED DESCRIPTION OF THE INVENTION

Technical Problem

The present invention is conceived to solve the aforementioned problems, and provides a system and a method of managing a battery, which charge and discharge electric energy discharged in each battery module by adding a balancing battery to a balancing circuit that uniformly maintains a voltage of a battery system through charging/discharging of the plurality of battery modules, thereby efficiently utilizing energy according to balancing.

Technical Solution

As a technical means for solving the foregoing technical problem, a system for managing a battery according to an exemplary embodiment includes: a battery unit which includes a plurality of battery modules and provides electric energy to an electronic device; a cooling fan which adjusts a flow rate of a fluid flowing into the battery unit; a fan control circuit which controls an operation of the cooling fan; and a balancing battery which performs balancing of the plurality of battery modules by supplying electric energy to one or more of the plurality of battery modules and charging the one or more battery modules, or receiving electric energy from one or more of the plurality of battery modules, and supplies electric energy to the cooling fan under a control of the fan control circuit.

Further, according to another exemplary embodiment, the cooling fan may be provided in each of the plurality of battery modules.

Further, according to still another exemplary embodiment, the fan control circuit may operate a cooling fan corresponding to a battery module, of which at least one of a temperature and a discharged current quantity is equal to or larger than a threshold value, among the plurality of battery modules.

Further, according to yet another exemplary embodiment, when a residual power quantity of the balancing battery is equal to or larger than a first threshold value, the fan control circuit may operate the cooling fan.

Further, according to still yet another exemplary embodiment, the fan control circuit may operate the cooling fan until the residual power quantity of the balancing battery is equal to or smaller than a second threshold value.

As a technical means for solving the foregoing technical problem, a method of managing a battery according to an exemplary embodiment includes: a monitoring operation of monitoring a state of a plurality of battery modules included in a battery unit which provides electric energy to an electronic device; a cell balancing operation of adjusting a voltage of the plurality of battery modules by supplying electric energy stored in a balancing battery to at least one of the plurality of battery modules or receiving electric energy from at least one of the plurality of battery modules based on the monitored state of the battery modules; and a cooling fan controlling operation of supplying, by the balancing battery, electric energy to a cooling fan which adjusts a flow rate of a fluid flowing into at least one of the plurality of battery modules based on the monitored state of the battery modules.

Further, according to another exemplary embodiment, the cooling fan controlling operation may include: selecting one or more cooling fans among the cooling fans installed in the plurality of battery modules, respectively, based on the monitored state of the battery modules; and supplying, by the balancing battery, electric energy to the selected one or more cooling fans.

Further, according to still another exemplary embodiment, the selecting of the one or more cooling fans among the cooling fans may include selecting a cooling fan corresponding to a battery module, of which at least one of a temperature and a discharged current quantity is equal to or larger than a threshold value, among the plurality of battery modules.

Further, according to yet another exemplary embodiment, the cooling fan controlling operation may include: determining whether a residual power quantity of the balancing battery is equal to or larger than a first threshold value; and when the residual power quantity of the balancing battery is equal to or larger than the first threshold value, operating the cooling fan.

Further, according to still yet another exemplary embodiment, the operating of the cooling fan may include: determining whether the residual power quantity of the balancing battery is equal to or smaller than a second threshold value; and operating the cooling fan until the residual power quantity of the balancing battery is equal to or smaller than the second threshold value.

Advantageous Effects

According to the exemplary embodiment of the present invention, it is possible to actively perform balancing of a battery by charging and discharging electric energy of each battery module by using a balancing battery.

Further, according to the exemplary embodiment of the present invention, it is possible to more efficiently use electric energy disappearing due to balancing by cooling a battery module by using electric energy stored in a balancing battery.

Further, according to the exemplary embodiment of the present invention, it is possible to perform balancing by using even a balancing battery having a small capacity by providing electric energy stored in a balancing battery to a cooling fan.

BEST MODE

The present invention will be described in detail below with reference to the accompanying drawings. Herein, repeated descriptions and the detailed description of a publicly known function and configuration that may make the gist of the present invention unnecessarily ambiguous will be omitted. Exemplary embodiments of the present invention are provided so as to more completely explain the present invention to those skilled in the art. Accordingly, the shape, the size, etc., of elements in the figures may be exaggerated for a more clear explanation.

Throughout this specification, when it is described that an element is "coupled" to another element, the element may be "directly coupled" to the other element and the element is "electrically coupled" to the other element with another element interposed therebetween.

Throughout the specification, unless explicitly described to the contrary, the word "include/comprise" and variations such as "includes/comprises" or "including/comprising" mean further including other constituent elements, not excluding the other constituent elements.

In addition, the term " . . . unit" described in the specification means a unit for processing at least one function and operation and may be implemented by hardware components or software components and combinations thereof.

Figure 1:
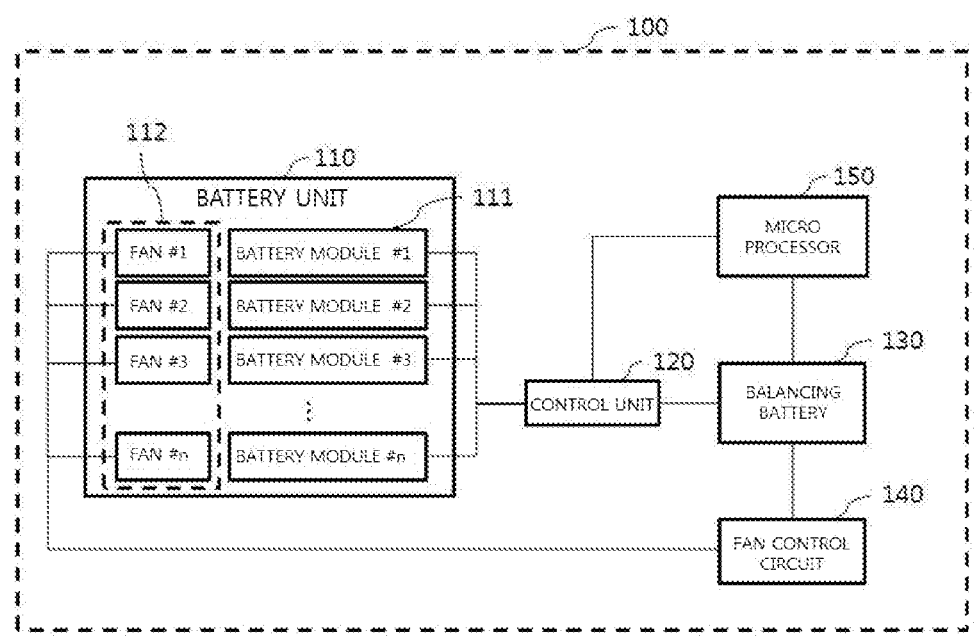
FIG. 1 is a diagram schematically illustrating a structure of a battery managing system using a balancing battery according to an exemplary embodiment of the present invention.

FIG. 1 is a diagram schematically illustrating a structure of a battery managing system using a balancing battery according to an exemplary embodiment of the present invention.

A battery managing system 100 according to an exemplary embodiment may include a battery unit 110, a control unit 120, a balancing battery 130, a fan control circuit 140, and a microprocessor 150.

According to the exemplary embodiment, the battery unit 110 may include the plurality of battery modules 111. The battery unit 110 may provide electric energy stored in the plurality of battery modules 111 to an electronic device.

The electronic device may mean a load consuming electric energy provided from the battery unit in order to achieve a specific object. For example, the electronic device may include an electric vehicle, a hybrid vehicle, a plug-in hybrid vehicle, an uninterruptible power supply, and an energy storage system, but the present invention is not limited thereto.

Further, the battery unit 110 may include a secondary chargeable/dischargeable battery. The kind of battery module forming the battery unit 110 may include a lead storage battery, a nickel-cadmium battery, a nickel hydrogen battery, a lithium ion storage battery, and a lithium ion polymer battery, but is not limited thereto. In the present specification, it may be referred that the battery module includes the concept of a battery cell forming one unit of an energy storage device or a battery rack that is a set of the plurality of energy storage devices.

Further, the battery unit 110 according to the exemplary embodiment may include the cooling fan 112. The cooling fan 112 may adjust a flow rate of a fluid flowing into the battery unit 110 in order to cool heat generated when the battery module 111 discharges a current. According to the exemplary embodiment, the cooling fan 112 of the battery managing system 100 may also be separately provided in each battery module, but only one cooling fan 112 may be provided or one cooling fan 112 may also be provided for every plural battery modules.

The control unit 120 may control each configuration unit of the battery managing system 100. The control unit 120 may include one or more processors. Further, the control unit 120 may monitor a state of each battery module 111. The state of the battery module may include, for example, at least one of a temperature, a discharged current quantity, and an output voltage of the battery module, but is not limited thereto. The control unit 120 provides electric energy of some battery modules 111 to the balancing battery 130 according to the state of the battery module 111, thereby discharging the battery module 111 and charging the balancing battery. Further, the control unit 120 may provide energy stored in the balancing battery 130 to some battery modules 111, thereby charging some battery modules 111.

Further, the control unit 120 may also enable the balancing battery 130 to supply power to the microprocessor 150 based on a state of power supplied to the microprocessor 150.

The balancing battery 130 may perform balancing of the plurality of battery modules. The balancing battery 130 according to the exemplary embodiment stores the predetermined quantity of electric energy, and when outputs of some battery modules are short, the balancing battery 130 may supply electric energy to a corresponding battery module. Further, when an overvoltage is generated in some battery modules, the balancing battery 130 is charged by receiving electric energy from a corresponding battery module, thereby discharging the corresponding battery module.

Further, the battery unit 10 for controlling the battery balancing may also further include a separate switch, which is connected with each battery module, and which is switched on when the battery unit 110 and the balancing battery 130 perform the balancing to connect the battery module 111 of the battery unit 110 and the balancing battery 130, and which is switched off when the battery unit 110 and the balancing battery 130 do not perform the balancing to prevent the battery module 111 of the battery unit 110 from being connected with the balancing battery 130, thereby connecting the battery unit 110 and a circuit of the balancing battery 130 only when the balancing is performed. Herein, the kind of switch is not limited, and may include, for example, a mechanical relay, a photo MOS relay, a solid state relay, a bipolar junction transistor (BJT), and a metal oxide semiconductor field effect transistor (MOSFET).

The fan control circuit 140 according to the exemplary embodiment may include an integrated circuit for controlling an operation of the cooling fan. According to the exemplary embodiment, the fan control circuit 140 may receive a control signal for the cooling fan from the control unit 120 to control the cooling fan. Otherwise, according to another exemplary embodiment, the fan control circuit 140 may also autonomously control the cooling fan according to a specific condition, such as a state of the battery module 111 or a residual power quantity of the balancing battery 130.

According to the exemplary embodiment, the fan control circuit 140 may control the cooling fan 112 based on a temperature of the battery module 111. When a temperature of the battery module 111 is equal to or larger than a threshold value, the fan control circuit 140 may enable the cooling fan 112 to be operated. Herein, when the cooling fan 112 is provided in each battery module 111, the fan control circuit 140 may enable the cooling fan 112 provided in the battery module 111, of which the temperature is equal to or larger than the threshold value, to be selectively operated. Herein, the cooling fan 112 may be driven by using electric energy supplied by the balancing battery 130.

Further, according to another exemplary embodiment, the fan control circuit 140 may control the cooling fan 112 based on a discharged current quantity of the battery module 111. When the cooling fan 112 is controlled based on the discharged current quantity of the battery module 111, the cooling fan 112 is operated in advance before a temperature is increased by the high discharged current quantity, thereby preventing the battery module 111 from overheating. When the discharged current quantity of the battery module 111 is equal to or larger than a threshold value, the fan control circuit 140 may enable the cooling fan 112 to be operated. Herein, when the cooling fan 112 is provided in each battery module 111, the fan control circuit 140 may enable the cooling fan 112 provided in the battery module 111, of which the discharged current quantity is equal to or larger than the threshold value, to be selectively operated. Herein, the cooling fan 112 may be driven by using electric energy supplied by the balancing battery 130.

According to anther exemplary embodiment, the fan control circuit 140 may control the cooling fan 120 based on a residual power quantity of the balancing battery 130. When the balancing battery 130 is fully charged, the balancing battery 130 cannot be used for the purpose of discharging the battery module 111. Accordingly, when the residual power quantity of the balancing battery 130 is equal to or larger than a predetermined value, it is necessary to discharge the balancing battery 130. According to the present exemplary embodiment, when the residual power quantity of the balancing battery 130 is equal to or larger than a first threshold value, the fan control circuit 140 may supply electric energy of the balancing battery 130 to the cooling fan 112 to discharge the balancing battery 130. According to some exemplary embodiments, the fan control circuit 140 may operate the cooling fan 112 until the residual power quantity of the balancing battery 130 is equal to or smaller than a second threshold value.

The microprocessor 150 may control each constituent element of an electronic device receiving electric energy from the battery unit 110.

Figure 2:
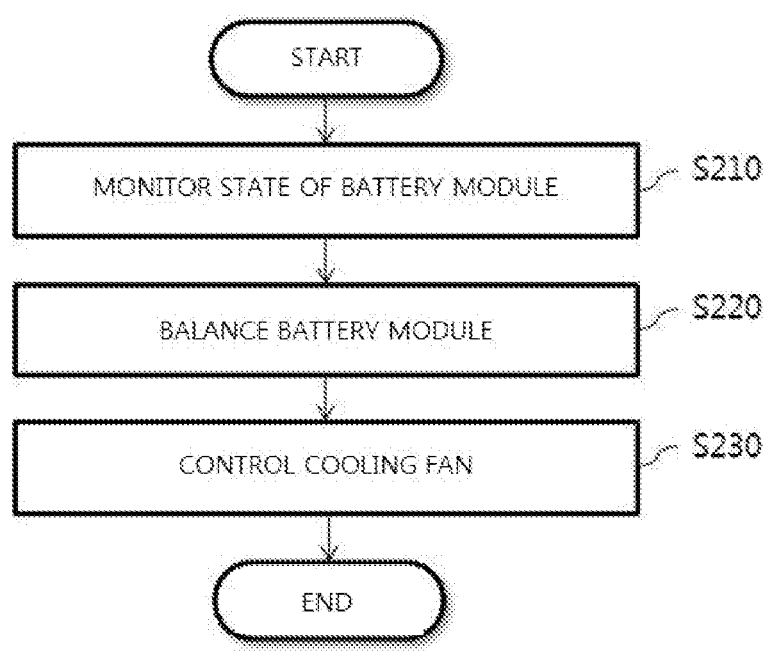
FIG. 2 is a flowchart simply illustrating a process of managing a battery according to an exemplary embodiment of the present invention.

FIG. 2 is a flowchart simply illustrating a process of managing a battery according to an exemplary embodiment of the present invention.

First, in operation S210, the battery managing system according to the exemplary embodiment may monitor a state of a battery module. For example, the battery managing system may measure an output voltage of a battery module by using a voltage measuring unit provided in the battery module. For another example, the battery managing system may measure a temperature of the battery module by using a temperature sensor provided in the battery module, or measure a current by using a current measuring device provided in the battery module. However, the present invention is not limited thereto.

Then, in operation S220, the battery managing system according to the exemplary embodiment may perform balancing on the battery module based on the monitored state of the battery module by using the balancing battery. According to the exemplary embodiment, in operation S220, the balancing battery 130 may store the predetermined quantity of electric energy, and when outputs of some battery modules are short, the balancing battery 130 may supply electric energy to a corresponding battery module. Further, when an overvoltage is generated in some battery modules, the balancing battery 130 is charged by receiving electric energy from a corresponding battery module, thereby discharging the corresponding battery module.

Then, in operation S230, the battery managing system according to the exemplary embodiment may control the cooling fan based on the state of the battery module. For example, when a temperature of the battery module 111 is equal to or larger than a threshold value, the battery managing system may enable the cooling fan 112 to be operated. Herein, when the cooling fan 112 is provided in each battery module 111, the cooling fan 112 provided in the battery module 111, of which the temperature is equal to or larger than the threshold value, may be selectively operated. For another example, the battery managing system may control the cooling fan 112 based on a discharged current quantity of the battery module 111. When the battery managing system controls the cooling fan 112 based on the discharged current quantity of the battery module 111, the battery managing system operates the cooling fan 112 in advance before a temperature is increased by the high discharged current quantity, thereby preventing the battery module 111 from overheating. When the discharged current quantity of the battery module 111 is equal to or larger than a threshold value, the fan control circuit 140 may enable the cooling fan 112 to be operated. Herein, when the cooling fan 112 is provided in each battery module 111, the fan control circuit 140 may enable the cooling fan 112 provided in the battery module 111, of which the discharged current quantity is equal to or larger than the threshold value, to be selectively operated.

Further, according to another exemplary embodiment, in operation S230, the battery managing system may control the cooling fan based on a residual power quantity of the balancing battery. For example, the battery managing system may detect the residual power quantity of the balancing battery. When the residual power quantity of the balancing battery is equal to or larger than a first threshold value, the battery managing system may drive the cooling fan by using electric energy of the balancing battery until the residual power quantity of the balancing battery is equal to or smaller than a second threshold value to discharge the balancing battery.

Figure 3:
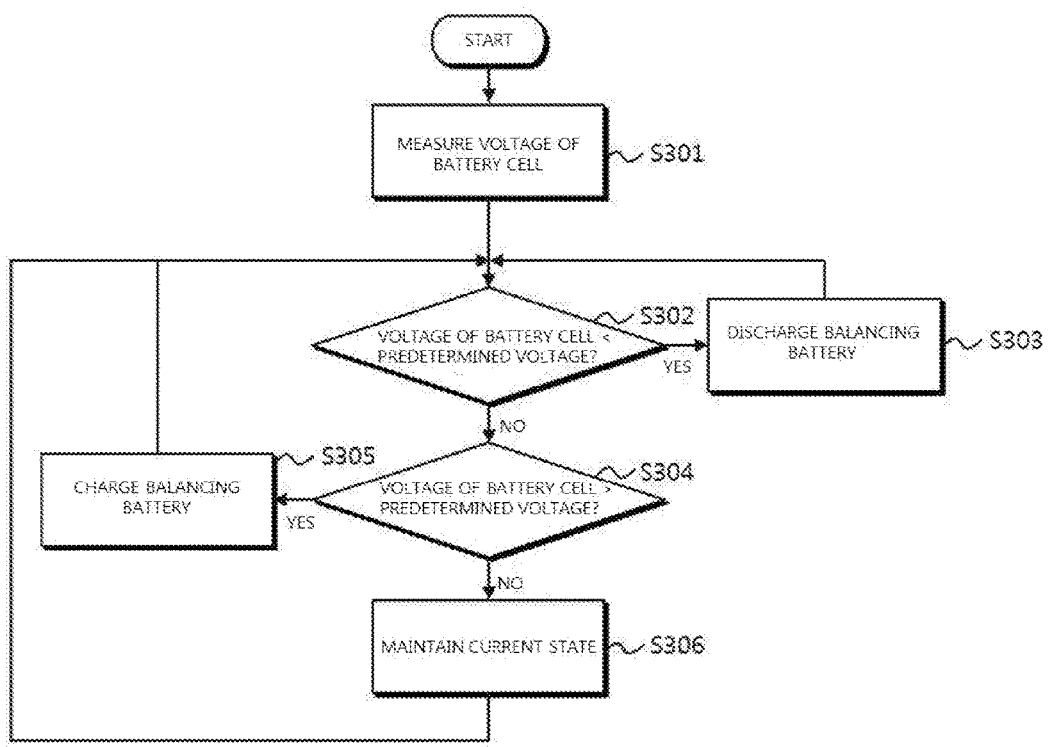
FIG. 3 is a diagram illustrating an operation of performing balancing by using a balancing battery 130 according to an exemplary embodiment of the present invention.

FIG. 3 is a diagram illustrating an operation of performing balancing by using the balancing battery 130 according to an exemplary embodiment of the present invention.

According to the exemplary embodiment, first, the battery managing system 100 may measure voltages of the balancing battery 130 and the battery modules from the battery unit 110 (S301).

Then, the battery managing system 100 may compare the measured voltages with a first threshold value and determine a case where the measured voltage of the battery module is higher than the first threshold value (S302). Herein, the first threshold value may mean a predetermined voltage value. When the voltage of the battery module is equal to or larger than the first threshold value, the battery managing system 100 according to the exemplary embodiment may determine that an overvoltage is generated in the corresponding battery module.

When it is determined that the voltage of the battery module 111 is larger than the first threshold value, the balancing battery 130 may be charged by using electric energy of the corresponding battery module 111. The balancing battery 130 is charged by using the electric energy of the battery module 111, in which the overvoltage is generated, so that the battery managing system 100 may discharge the battery module 111, in which the overvoltage is generated (S303).

When the battery managing system 100 determines that the voltage of the battery module 111 is not larger than the first threshold value, the battery managing system 100 may compare the voltage of the battery module 111 with a second threshold value and determine whether a low voltage state is generated in the battery module (S304). Herein, the second threshold value is a predetermined voltage value and may have a smaller value than the first threshold value. When the voltage of the battery module is smaller than the second threshold value, the battery managing system 100 according to the exemplary embodiment may determine that the low voltage is generated in the corresponding battery module.

When the battery managing system 100 determines that the voltage of the battery module 111 is smaller than a predetermined voltage, the battery managing system 100 may charge the balancing battery 130 (S305).

Herein, the operation of performing the balancing by using the balancing battery 130 may also further include controlling a switch (not illustrated) for charging and discharging the battery module.

When it is determined that the voltage of the battery module 111 is not smaller than the predetermined voltage, the battery managing system 100 may determine that the battery module is not in low voltage and high voltage states, and maintain a state in which the balancing of the battery modules by using the balancing battery 130 is not performed.

Figure 4:
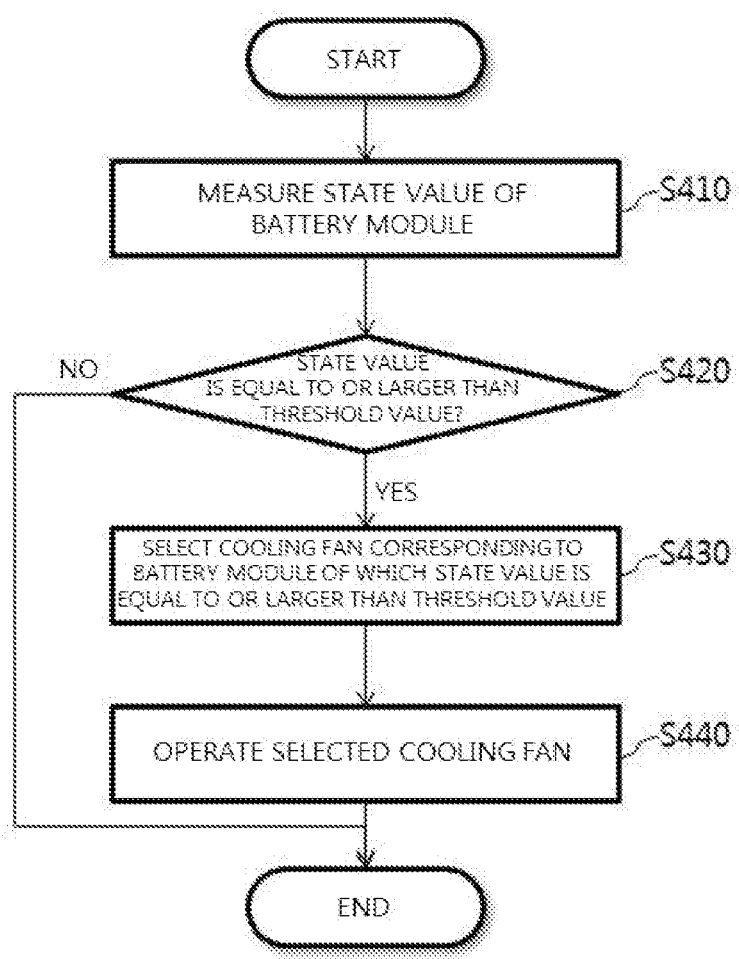
FIG. 4 is a flowchart illustrating a process of controlling a cooling fan based on a state value of a battery module according to an exemplary embodiment of the present invention.

FIG. 4 is a flowchart illustrating a process of controlling the cooling fan based on a state value of a battery module according to an exemplary embodiment of the present invention.

First, in operation S410, the battery managing system according to the exemplary embodiment may measure a state value of a battery module. Herein, the state value of the battery module means information obtained by measuring a value related to the battery module. For example, the state value of the battery module may include at least one of a temperature and a discharged current quantity of the battery module, but is not limited thereto.

Then, in operation S420, the battery managing system according to the exemplary embodiment may determine whether the measured state value of the battery module is equal to or larger than a threshold value. For example, the battery managing system may determine whether a temperature of the battery module is higher than a predetermined threshold value. For another example, the battery managing system may determine whether a current quantity discharged from the battery module is higher than a threshold value. When the state value measured in operation S420 is smaller than the threshold value, the battery managing system may terminate the process.

Then, in operation S430, when the measured state value is equal to or larger than the threshold value, the battery managing system according to the exemplary embodiment may select a cooling fan installed in the battery module of which the state value is equal to or larger than the threshold value. In operation S440, the battery managing system may operate the cooling fan by enabling the balancing battery to supply electric energy to the selected cooling fan. That is, the battery managing system operates the cooling fan by using the electric energy of the balancing battery, thereby driving the cooling fan without separate power supply.

The battery managing system according to the exemplary embodiment repeatedly performs operations S410 to S440, thereby operating the cooling fan according to the state of the battery module.

Figure 5:
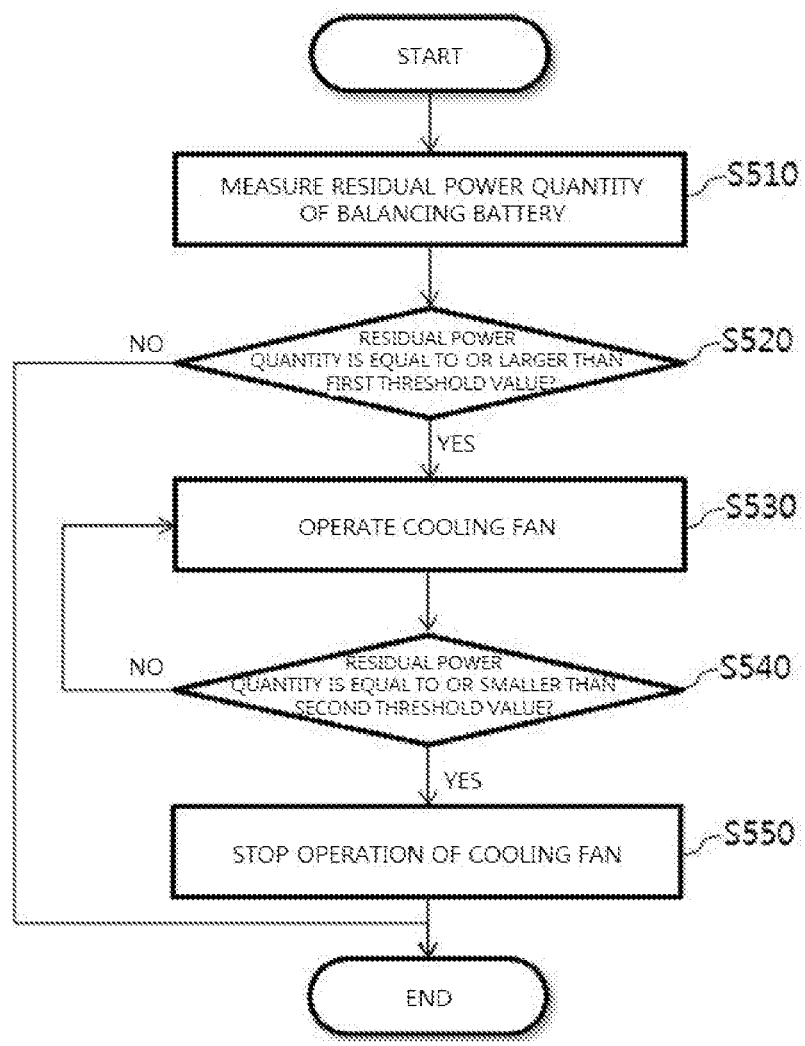
FIG. 5 is a flowchart illustrating a process of controlling a cooling fan based on a residual power quantity of a balancing battery according to an exemplary embodiment of the present invention.

FIG. 5 is a flowchart illustrating a process of controlling a cooling fan based on a residual power quantity of the balancing battery according to an exemplary embodiment of the present invention.

First, in operation S510, the battery managing system according to the exemplary embodiment may measure a residual power quantity of the balancing battery. Then, in operation S520, the battery managing system may determine whether the residual power quantity is equal to or larger than a first threshold value. When the residual power quantity of the balancing battery is smaller than the first threshold value, the battery managing system may terminate the process.

When the residual power quantity is equal to or larger than the first threshold value in operation S520, the battery managing system may operate the cooling fan in operation S530. Herein, the cooling fan is driven by using electric energy supplied by the balancing battery.

Then, in operation S540, the battery managing system may determine whether the residual power quantity is equal to or smaller than a second threshold value by supplying, by the balancing battery, electric energy to the cooling fan. Herein, the second threshold value may be set with a value smaller than the first threshold value. When the residual power quantity is larger than the second threshold value, the battery managing system may continuously operate the cooling fan (S530).

When the residual power quantity of the balancing battery is equal to or smaller than the second threshold value, the battery managing system may stop an operation of the cooling fan in operation S550.

Figure 6:
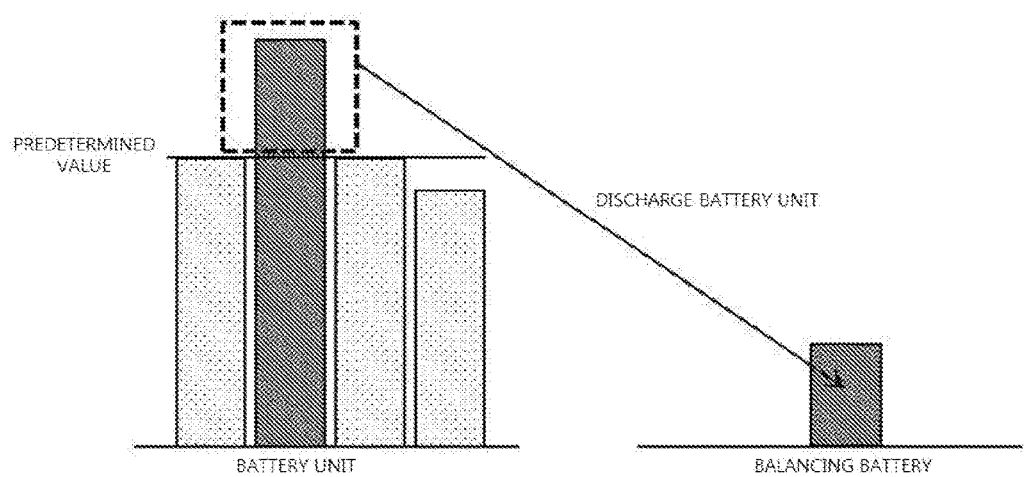
FIG. 6 is a diagram illustrating an example, in which a voltage of a battery module is compared with a predetermined voltage and when the voltage of the battery module is higher than the predetermined voltage, electric energy of the plurality of battery modules is supplied to a balancing battery according to an exemplary embodiment of the present invention.

FIG. 6 is a diagram illustrating an example, in which a voltage of a battery module is compared with a predetermined voltage and when the voltage of the battery module is higher than the predetermined voltage, electric energy of the plurality of battery modules is supplied to a balancing battery according to an exemplary embodiment of the present invention.

According to the exemplary embodiment, when it is determined that a voltage of the battery module 111 is larger than a first threshold value, the battery managing system 100 may charge the balancing battery 130 by using electric energy of the corresponding battery module 111. The battery managing system 100 charges the balancing battery 130 by using the electric energy of the battery module 111, in which an overvoltage is generated, so that the battery managing system 100 may discharge the battery module 111, in which the overvoltage is generated. Herein, the first threshold value may mean a predetermined voltage value.

Figure 7:
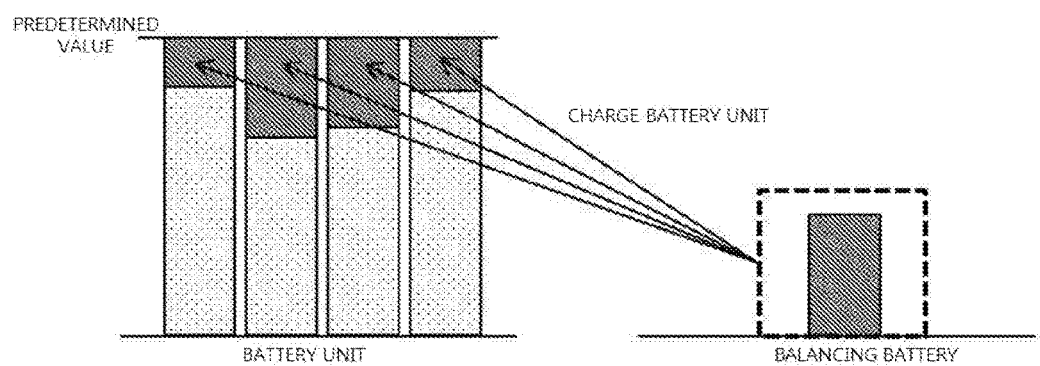
FIG. 7 is a diagram illustrating an example, in which a voltage of a battery module is compared with a predetermined voltage and when the voltage of the battery module is lower than the predetermined voltage, electric energy of the balancing battery is supplied to the plurality of battery modules according to an exemplary embodiment of the present invention.

FIG. 7 is a diagram illustrating an example, in which a voltage of a battery module is compared with a predetermined voltage and when the voltage of the battery module is lower than the predetermined voltage, electric energy of the balancing battery is supplied to the plurality of battery modules according to an exemplary embodiment of the present invention.

According to the exemplary embodiment, the battery managing system 100 may compare a voltage of the battery module 111 with a second threshold value, and determine whether a low voltage state is generated in the battery module. Herein, the second threshold value is a predetermined voltage value and may have a smaller value than the first threshold value. When the voltage of the battery module is smaller than the second threshold value, the battery managing system 100 according to the exemplary embodiment may determine that a low voltage is generated in the corresponding battery module and charge the balancing battery 130.

In the forgoing, the specific exemplary embodiment of the present invention has been illustrated and described, but it is apparent to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

EXPLANATION OF REFERENCE NUMERALS AND SYMBOLS

100: Battery managing system
110: Battery unit
111: Battery module
112: Cooling fan
120: Control unit
130: Balancing battery
140: Fan control circuit
150: Microprocessor

The invention claimed is:

1. A system for managing a battery, the system comprising:
 a battery unit including a plurality of battery modules, wherein the plurality of battery modules are configured to provide electric energy to an electronic device;
 a balancing battery electrically coupled to the battery unit;
 a cooling fan configured to adjust a flow rate of a fluid flowing into the battery unit, wherein the balancing battery is configured to supply electric energy to the cooling fan; and
 a fan control circuit configured to control operation of the cooling fan, and to control the supply of electric energy from the balancing battery to the cooling fan,
 wherein the balancing battery is further configured to perform balancing of the plurality of battery modules included in the battery unit by:
  supplying electric energy to one or more of the plurality of battery modules and charging the one or more battery modules; and
  receiving electric energy from one or more of the plurality of battery modules.

2. The system of claim 1, wherein the cooling fan is provided in each of the plurality of battery modules.

3. The system of claim 2, wherein the fan control circuit operates a cooling fan corresponding to a battery module, of which at least one of a temperature and a discharged current quantity is equal to or larger than a threshold value, among the plurality of battery modules.

4. The system of claim 1, wherein when a residual power quantity of the balancing battery is equal to or larger than a first threshold value, the fan control circuit operates the cooling fan.

5. The system of claim 4, wherein the fan control circuit operates the cooling fan until the residual power quantity of the balancing battery is equal to or smaller than a second threshold value.

6. A method of managing a battery, the method comprising:
 a monitoring operation of monitoring a state of a plurality of battery modules included in a battery unit, wherein the plurality of battery modules are configured to provide electric energy to an electronic device;
 a balancing operation of adjusting a voltage of the plurality of battery modules, the balancing operation performed by a balancing battery electrically coupled to the battery unit by:
  supplying electric energy stored in the balancing battery to at least one of the plurality of battery modules; and
  the balancing battery receiving electric energy from at least one of the plurality of battery modules,
 based on the monitored state of the battery modules; and a cooling fan controlling operation of supplying electric energy from the balancing battery to a cooling fan to adjust a flow rate of a fluid flowing into at least one of the plurality of battery modules based on the monitored state of the battery module.

7. The method of claim 6, wherein the cooling fan controlling operation includes:
  selecting one or more cooling fans among the cooling fans installed in the plurality of battery modules, respectively, based on the monitored state of the battery modules; and
  supplying, by the balancing battery, electric energy to the selected one or more cooling fans.

8. The method of claim 7, wherein the selecting of the one or more cooling fans among the cooling fans includes selecting a cooling fan corresponding to a battery module, of which at least one of a temperature and a discharged current quantity is equal to or larger than a threshold value, among the plurality of battery modules.

9. The method of claim 6, wherein the cooling fan controlling operation further includes:
  determining whether a residual power quantity of the balancing battery is equal to or larger than a first threshold value; and
  when the residual power quantity of the balancing battery is equal to or larger than the first threshold value, operating the cooling fan.

10. The method of claim 9, wherein the operating of the cooling fan includes:
  determining whether the residual power quantity of the balancing battery is equal to or smaller than a second threshold value; and
  operating the cooling fan until the residual power quantity of the balancing battery is equal to or smaller than the second threshold value.

11. The system of claim 1, wherein when a voltage of one of the plurality of battery modules exceeds a first predetermined voltage value, the balancing battery is configured to receive electric energy from said one of the plurality of battery modules.

12. The system of claim 1, wherein when a voltage of one of the plurality of battery modules is less than a second predetermined voltage value, the balancing battery is configured to supply electric energy to said one of the plurality of battery modules.

13. The system of claim 1, wherein when a residual power quantity of the balancing battery is equal to or larger than a first threshold value, the balancing battery is configured to supply electric energy to the cooling fan.

14. The system of claim 1, wherein the balancing battery is the only battery of the system configured to supply electric energy to one or more of the plurality of battery modules and receive electric energy from one or more of the plurality of battery modules.

15. The system of claim 1, wherein the balancing battery is the only battery of the system configured to supply electric energy to the cooling fan.

* * * * *